United States Patent [19]
Kim et al.

[11] Patent Number: 6,024,805
[45] Date of Patent: Feb. 15, 2000

[54] METAL HYDRIDE ADDITION FOR REDUCING CORROSION POTENTIAL OF STRUCTURAL STEEL

[75] Inventors: Young Jin Kim, Clifton Park; Peter Louis Andresen, Schenectady; George Charles Sogoian, Glenville, all of N.Y.

[73] Assignee: General Electric Company, Schenectady, N.Y.

[21] Appl. No.: 08/968,970

[22] Filed: Nov. 12, 1997

[51] Int. Cl.[7] .................................................. C23C 8/00
[52] U.S. Cl. ......................... 148/240; 148/247; 148/272; 148/273; 148/284; 428/472.1; 428/472.2; 376/306
[58] Field of Search ..................... 148/284, 285, 148/240, 247, 272, 273; 428/472.1, 472.2; 376/305, 306; 252/188.26

[56] References Cited

U.S. PATENT DOCUMENTS

| | | | |
|---|---|---|---|
| 5,130,080 | 7/1992 | Neidrach | 376/305 |
| 5,135,709 | 8/1992 | Andresen et al. | 376/305 |
| 5,147,602 | 9/1992 | Andresen et al. | 420/35 |
| 5,448,605 | 9/1995 | Hettiarachchi et al. | 376/305 |
| 5,465,281 | 11/1995 | Andresen et al. | 376/305 |
| 5,774,516 | 6/1998 | Hettiarachchi et al. | 376/305 |

OTHER PUBLICATIONS

Reactor Handbook, 2nd ed., New York, Interscience Press Publishers, 1960, pp. 728–729, 955–960, 1068–1071, 1105–1106, TK.9202.R4 1960.

"State of Knowledge of Radiation Effects on Environmental Cracking in Light Water Reactor Core Materials", by P.L. Andersen et al., Proc. 4th Int. Cont. On Environmental Degradation of Materials in Nuclear Power Systems—Water Reactions, NALE, Houston, TX 1990.

"Noble Metal Technology for BWR's", by P.L. Andersen and Y.J. Kim, Proceedings of International Symposium on Plant Aging and Life Productions of Corrodible Structures, May 15–18, 1995, Sapporo, Japan.

"Noble Metal Chemical Addition for Control of SCC in BWR's", by S. Hettizrachchi et al., Proceedings of International Symposium on Plant Aging and Life Productions of Corrodible Structures, May 15–18, 1995, Sapporo, Japan.

"The Application of Noble Metals in Light–Water Reactors", by Y.J. Kim et al., The Journal of the Minerals, Metals & Materials Society, vol. 49, No. 4, Apr. 1992, p. 14–18.

*Primary Examiner*—Prince Willis
*Assistant Examiner*—Andrew L. Oltmans
*Attorney, Agent, or Firm*—Tyler Maddry; Noreen C. Johnson

[57] ABSTRACT

A method for reducing the corrosion potential of steel vessels and piping used in nuclear reactors, in particular steel vessels and piping carrying high temperature water and/or steam which has a concentration of oxygen therein. A metal hydride is added to the water, the hydrogen of such metal hydride combining with oxidizing agents, typically oxygen, present in the water to reduce the concentration of such oxidizing agents. In the preferred embodiment the metal of the metal hydride is a metal that is capable of reacting with oxygen to form a substantially non-water soluble and substantially electrically insulating compound on the surface of the steel, and in particular is one that may react with and become deposited or incorporated into a pre-existing thin oxide film layer on the surface of the steel to thereby render such thin oxide layer substantially non-electrically conducting.

21 Claims, 5 Drawing Sheets

METAL HYDRIDE ADDITION FOR REDUCING CORROSION POTENTIAL OF STRUCTURAL STEEL

FIELD OF THE INVENTION

The invention relates to a method of reducing the corrosion potential of structural steel exposed to high-temperature water, and more particularly to an in-situ method for treating structural steel exposed to such high temperature water. As used herein, the term "high-temperature water" means water of about 100° C. or greater, steam, or the condensate thereof. High temperature water can be found in a variety of known apparatus, such as steam-driven turbines, and particularly in boiling water nuclear reactors, namely in reactor pressure vessels containing water for cooling nuclear reactor cores and extracting heat energy produced by such reactor cores.

BACKGROUND OF THE INVENTION

Steel pressure vessels and piping exposed to high temperature water are prone to corrosion due to oxidation of the various metals therein by oxidizing agents, particularly oxygen, present in the high temperature water. Corrosion of such vessels and piping can lead to a variety of problems in such vessels and piping, including stress corrosion cracking, crevice corrosion and erosion corrosion, leading to leakage and/or bursting of such vessels/piping.

In boiling water nuclear reactors, specifically in reactor pressure vessels or piping containing water for cooling the reactor cores and extracting heat energy therefrom, the water which circulates in such vessels and piping has an operating pressure and temperature when exiting the reactor pressure vessel of about 7 MPa and 288° C. for a boiling water reactor, and about 15 MPa at 320° C. for a pressurized water reactor.

Intergranular stress corrosion cracking (IGSCC), or simply stress corrosion cracking (SCC), is a known problem in such steel pressure vessels and piping used in nuclear reactors. SCC, as used herein, refers to cracking propagated by static or dynamic tensile stressing in combination with corrosion at the crack tip. Nuclear reactor pressure vessels and piping are subject to a variety of stresses, such as those arising from operating pressure for containment of the high temperature water in a liquid state, differences in thermal expansion, and other sources such as residual stress from welding, cold working, and other metal treatments. In addition, water chemistry, welding, crevice geometry, heat treatment, and radiation can increase the susceptibility of such vessels and piping to SCC.

SCC is of great concern in boiling water reactors (BWRs) which utilize light water as a means of cooling nuclear reactor cores and extracting heat energy produced by such reactor cores, for two reasons. Firstly, stress corrosion cracking which causes any leakage or bursting of such vessels or piping may result in the nuclear core of the reactor not being sufficiently cooled, with dire consequences as a result. Secondly, the problem of elevated concentrations of oxidizing agents, such as $O_2$ and $H_2O_2$, in the high temperature water carried in such pressure vessels and piping is more acute in nuclear reactors due to radiolytic decomposition of the high temperature water in the core of the BWR.

In particular, the steel is caused to be oxidized, namely electrons flow from the metals in the steel to the oxidizing agent, typically oxygen, which is caused to be reduced, i.e., it acquires the electrons in the process. For example, the iron in the steel is oxidized as per the following equations:

$$Fe \rightarrow Fe^{+2} + 2e^-$$

and $$Fe \rightarrow Fe^{+3} + 3e^-$$

which reach their solubility limit and react with water, as per either of the following equations:

$$2Fe^{+3} + 3H_2O \rightarrow Fe_2O_3 + 6H^+$$

and $$3Fe^{+2} + 4H_2O \rightarrow Fe\ Fe_3O_4 + 8H^+ + 2e^-$$

The presence of greater concentrations of oxidizing species in the high temperature water therefore increases the electrochemical corrosion potential (ECP) of the steel. The ECP is a measure of the thermodynamic tendency for corrosion to occur, and is a fundamental parameter in determining rates of stress corrosion cracking. More importantly, the high ECP on the outside surface of the metal-coupled with the low ECP in the crack (where oxidants are consumed faster than they can diffuse into the crack) produces a gradient in corrosion potential that drives anions (like $Cl^-$ and $SO_4^{-2}$) into the cracks. This chemistry is much more aggressive, and can greatly accelerate SCC.

A well-known method to reduce the ECP and thus the stress corrosion cracking of steel pressure vessels and piping in nuclear reactors is to add hydrogen gas to the reactor feedwater, the hydrogen gas thereafter combining with oxidizing agents within the high temperature water to thereby reduce the concentration of oxidizing agents in the water and to thereby modify the high temperature water to a more reducing medium. In particular, the hydrogen combines with the oxidizing agents in the high temperature water, such as oxygen, resulting in a reduction in the concentration of oxygen in the high temperature water and accordingly a lesser availability of such oxidizing agent to cause oxidation of the steel. This has the very desirable benefit of reducing the corrosion potential of the steel vessel or piping carrying such high temperature water.

For type 304 stainless steel (containing 18–20% Cr, 8–10.5% Ni, and 2% Mn), it is known that if the ECP of such steel exposed to the high temperature water at about 288° C. can be reduced to values below $-230\ mV_{she}$ (standard hydrogen electrode) (hereinafter the "critical corrosion potential"), the stress corrosion cracking problem of such steel can be greatly reduced. The same generally applies for other types of steels. It is known that by addition of hydrogen gas in sufficient concentrations it is possible to lower the ECP of the steel to less than $-230\ mV_{she}$. However, high hydrogen additions of about 200 parts per billion (ppb) or greater in the reactor water are sometimes required to bring the ECP for 304 stainless steel or other steels below the critical corrosion potential. It typically is expensive to uniformly add significant quantities of hydrogen gas to the feedwater. Moreover, addition of hydrogen in such high amounts can result in an undesirably high radiation level in the steam-driven turbine section of a nuclear reactor used for power generation, due to the resultant volatility of the short-lived $N^{16}$ species in the reactor water steam. For most BWRs, the amount of hydrogen addition required to reduce the corrosion potential of the steel to thereby reduce stress corrosion cracking tendency to acceptable levels results in an increase in the main reactor water radiation levels by a factor of five to eight. This increase in main steam line radiation can cause high, even unacceptable, environmental dose rates that can require great expense for shielding. Accordingly, addition of substantial levels of hydrogen to reduce the ECP of the reactor vessel and piping is not by itself entirely satisfactory in nuclear reactors as a means of reducing the corrosion potential of steel vessels or piping carrying high temperature water.

An alternative approach to get around adding large amounts of hydrogen gas is to coat the stainless steel surface, or alloy the steel, with a noble metal, such as palladium, osmium, platinum, rutherium, rhodium, iridium, or a mixture thereof. Noble metals are electrocatalysts that efficiently promote the re-combination of oxidizing agents, such as $O_2$ and $H_2O_2$ in the water, with $H_2$. By having a noble metal plating on the surface of the metal, such provides surface sites by which redox reactions between the oxidizing agents and hydrogen can occur, i.e., such oxidizing agents can directly combine with the $H_2$ to form water, which becomes oxidized in the process, thereby reducing the concentration of oxidizing agents in the high temperature water in the region directly proximate the surface of the steel.

Methods for providing a noble metal coating to reduce corrosion potential are known. For example, U.S. Pat. No. 5,135,709 to Peter L. Andresen and Leonard W. Neidrach teaches depositing a noble metal onto a steel for the purposes of reducing the electrochemical corrosion potential of the steel exposed to high temperature water. The invention taught therein, as well as the invention described in U.S. Pat. No. 5,130,080, contemplates firstly providing the steel (ref column 11, lines 20–68 and column 12) with a very thin noble metal coating layer (typically in the range of 0.4 $\mu$m to 0.79 $\mu$m) applied by means of a known electroless plating process before subsequently exposing the steel to high temperature water. U.S. Pat. No. 5,130,080 further teaches circulating a very dilute solution of a soluble salt of a metal of the platinum group of metals within the reactor vessel and piping prior to initiation of the operation of the reactor, to allow a thin deposit of the platinum metal to be formed on the surfaces prior to such surfaces being exposed to high temperature water during operation of the reactor.

Noble metal technology allows the ECP of the steel to be reduced below critical corrosion potential levels using lesser amounts of hydrogen gas addition to the feedwater than would otherwise have been the case if the steel did not have a noble metal coating. Often, however, despite such noble metal coatings, quantities of hydrogen gas may still need to be added in quantities approaching or exceeding the stoichiometric concentrations of oxygen in the water, under the equation:

$$2H_{2(g)} + O_{2(g)} \rightarrow 2H_2O$$

before the ECP of the steel will be reduced below the critical value. The expense of bubbling at least some quantities of hydrogen into the feedwater is not avoided.

Other means to reduce the corrosion potential of steel vessels and piping which do not require the addition of hydrogen have been developed.

In particular, air plasma spraying of steel vessels and piping with an electrically-insulating material, namely a zirconia ($ZrO_2$) powder, or a yttria-stabilized zirconia (YSZ) powder, is known to significantly reduce the corrosion potential of the steel component without having to add hydrogen to the feedwater, and without the presence of a noble metal catalyst. In this regard, U.S. Pat. No. 5,465,281 to the present inventors Andresen and Kim, teaches a method of reducing the electrochemical corrosion potential of steel exposed to high temperature water. In particular, such patent discloses air plasma spraying of a steel surface with an insoluble and electrically non-conductive material, namely zirconia powder ($ZrO_2$), alumina ($Al_2O_3$), or yttria-stabilized zirconia (YSZ), so as to reduce the electrochemical corrosion potential of the steel when later exposed to high temperature water. FIGS. 13 and 14 of U.S. Pat. No. 5,465,281 show plots of corrosion potential versus oxygen concentration for uncoated type 304 stainless steel, compared with type 304 stainless steel air plasma sprayed with yttria-stabilized zirconia of 3, 5, and 10 mils (1 mil=0.001 inch) thickness, after immersion for 2 days (FIG. 13) and 3 months (FIG. 14). As may be seen from such plots, such coating is effective in reducing the ECP of the steel to less than $-230$ $mV_{she}$ for oxygen concentrations up to 300 ppb at 288° C., whereas the corrosion potential for uncoated type 304 steel begins to exceed $-230$ $mV_{she}$ commencing at oxygen concentration of 15 ppb, and is well in excess of $-230$ $mV_{she}$ at an oxygen concentration of 300 ppb and higher.

The method disclosed in U.S. Pat. No. 5,465,281 comprising thermal spraying of a zirconia or YSZ powder onto the steel vessel/piping is done before the steel vessel or piping is exposed to high temperature water, or at a time when the nuclear reactor is shut down and all high temperature water evacuated from the steel reactor vessel and piping to allow the thermal spraying. Thus, the coating cannot be applied in-situ, but must be applied at the time of manufacture of the vessel and piping prior to installation and exposure to high temperature water. Alternatively, if such equipment is already installed, the high temperature water may need to be evacuated before such surfaces can be properly thereby sprayed with the coating. Shutting down a nuclear reactor or steam generation plant, evacuation of the piping and vessels of water for the purposes of spray is necessarily very costly and a great inconvenience. Such method also possesses additional problems in that it is frequently extremely difficult to insert equipment for air plasma spraying within reactor vessels and piping, particularly where the flow passages for the high temperature water may be small and confined. As well, it is often impossible to uniformly apply such coating by air plasma spraying to the interior surfaces, with the result that significant surface areas of the steel, and numerous crevices, joints, and the like, will not be sprayed and therefore not receive the coating, leading to high corrosion potential in such areas. This is highly undesirable and eliminates such coating method as a means of reducing the corrosion potential of vessels and piping in a large number of situations.

Accordingly, a real and present need exists for an effective method, capable of being employed in-situ, for reducing the potential of steel vessels and piping, particularly those used in nuclear reactors, which are exposed to high temperature water.

SUMMARY OF THE INVENTION

We have discovered, in investigating in-situ means to reduce corrosion potential of steel exposed to high temperature water containing oxygen and/or other oxidizing agents, that addition of a metal hydride to high temperature water causes a reduction of the corrosion potential of steel exposed to such high temperature water. The metal hydride, which can be any metal within the periodic table of elements that is capable of bonding with hydrogen, such as zinc, aluminum, and the like, is capable of dissociating in the water to free the hydrogen ions, which thereafter combine with the oxidizing agents in the high temperature water so as to thereby reduce the concentration of such oxidizing agents, typically oxygen, in such water.

Accordingly, as a means of overcoming the drawbacks of the prior art methods and as a means for reducing corrosion potential of steel exposed to high temperature water without having to add hydrogen independently, the present invention in one of its broad aspects provides a method for reducing in-situ the corrosion potential of a stainless or carbon steel material, surfaces of which are in contact with high temperature water containing oxygen and/or other oxidizing agents such as hydrogen peroxide, comprising adding a metal hydride directly to the water, wherein the metal hydride is capable of dissociating in the water to provide hydrogen ions which combine with the oxygen and/or other oxidizing agents in the water so as to reduce the concentration of such oxidizing agents in the high temperature water.

Advantageously, the method of the present invention provides a means for achieving low corrosion potentials in steel pressure vessels and Boiling Water Reactor (BWR) components, namely reducing the corrosion potential of the steel at 288° C. to less than approximately $-230$ mV$_{she}$ without adding hydrogen separately. Another advantage is that most $H_2$ added is lost because it goes (partitions) preferentially to the steam phase. Metal hydrides have the advantage to low volatility so that they remain in the water phase, thus requiring less additive and permitting a sufficient concentration to exist in regions where boiling occurs.

Using the method of the present invention, the metal hydride ($MH_n$) is decomposed into metal ions and hydrogen in high temperature water on the metal surface, in accordance with the equation:

$$MH_n \rightarrow M^{+2} + nH^+ + (n+2)e^-$$

The high radiation flux present in a BWR will likely somewhat enhance the decomposition rate of the metal hydride compound to metal and hydrogen ions, respectively, in accordance with the above equation. The method of the present invention avoids many of the problems inherent in the known prior art method of adding hydrogen gas separately to the high temperature water and bubbling such gas into the water, in that the addition of hydrogen ions by addition of a metal hydride can be much more uniform and more evenly mixed into the water than is the case when adding a hydrogen gas, resulting in a more uniform overall reduction of the presence of oxidizing agents within the water. Such method further has the advantage over air plasma spraying of noble metal and other coatings used to reduce corrosion potential of the steel in that frequently such spray coatings are not able to be applied in small pressure vessels or piping, or at least not able to be applied uniformly.

The method of the present invention is particularly suited, where the metal in the metal hydride is of a certain type, to providing additional means, in addition to reducing the concentration of oxidizing agents in the high temperature water due to supply of hydrogen ions, for reducing the corrosion potential of the steel. Accordingly, in a preferred embodiment of the invention, the metal hydride is selected to contain a metal whose metal ions, upon dissociation in the high temperature water, are capable of being incorporated into a thin oxide layer formed on the steel surface by reacting with a substance (typically, but not necessarily, oxygen or an oxide) in such oxide layer. Incorporation of such metal ions into the thin oxide layer causes the oxide film to then have a low electrical conductivity, i.e., the thin oxide film becomes electrically insulating, which thereby further lowers the corrosion potential of the steel. Specifically, in a particular embodiment of this preferred embodiment of the invention, the metal hydride contains a metal selected from the group of metals comprising scandium, titanium, yttrium, zirconium, vanadium, hafnium, and niobium, and preferably the metal hydride utilized is one of, or a combination of, zirconium hydride, titanium hydride, and vanadium hydride.

Alternatively, or in addition, the metal ions from the metal hydride are capable of reacting with oxygen in the high temperature water to form a substantially non-water soluble and substantially electrically insulating layer on the steel surfaces. Advantageously such insulating layer likewise reduces the corrosion potential of the underlying steel. Metal ions suitable for such purpose are metal ions which when reacting with oxygen form an insoluble precipitate, such as aluminum, zinc, and those metals selected from Groups 3, 4, or 5, international notation, of the periodic table of elements, including particularly scandium, titanium, yttrium, zirconium, hafnium, vanadium, and niobium. Metal hydrides particularly suitable for use in accordance with such embodiment of the invention, due to their relatively low decomposition temperature into metal ions and hydrogen ions, are zirconium hydride, wherein the insulating layer formed contains zirconia (i.e., zirconium dioxide $ZrO_2$), yttrium hydride, wherein the insulating layer contains yttria (i.e., yttrium oxide $Y_2O_3$), aluminum hydride, wherein the layer so formed contains alumina ( i.e., aluminum oxide $Al_2O_3$), titanium hydride, or a mixture of yttrium hydride and zirconium hydride, wherein the layer so formed contains a yttria-stabilized zirconia.

Accordingly, utilizing the method of the preferred embodiment of the invention wherein the metal hydride is one of zirconium hydride, yttrium hydride, vanadium hydride, titanium hydride, or scandium hydride, three advantages are obtained, namely; (1) hydrogen ions are provided by decomposition of the metal hydride without having to add hydrogen separately; (2) oxidant concentrations in the high temperature water are reduced; and (3) a layer of low electric conductivity is formed, either by an oxide layer being deposited on the surface of the steel due to combination of the metal ions with oxygen in the water, or by incorporation of the metal ions into a preexisting oxide layer on the surface of the steel.

BRIEF DESCRIPTION OF THE DRAWINGS

Further advantages will appear from the following detailed description of the invention, taken together with the accompanying drawings in which.

DETAILED DESCRIPTION OF THE INVENTION

Figure 1:
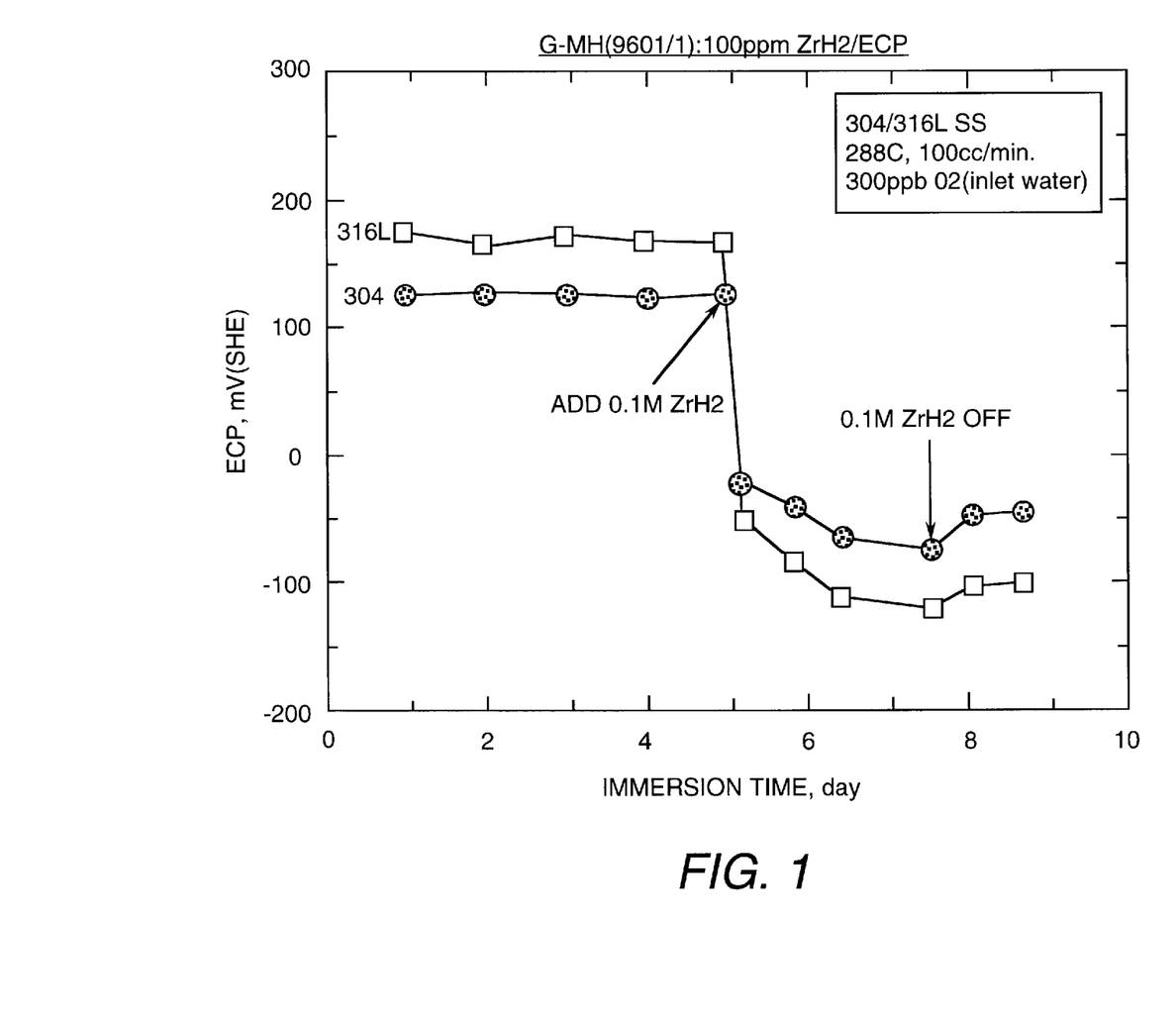
FIG. 1 is a plot of corrosion potential of type 304 stainless steel (●) and 316L stainless steel (□), immersed in high temperature water at 288° C. containing 300 parts per billion oxygen, illustrating the beneficial results of the present invention, namely the reduction of corrosion potential upon the addition of a 0.1M solution of a metal hydride ($ZrH_2$)

FIG. 1 graphically shows the effect on the reduction in corrosion potential of steel, in particular type 304 stainless steel (containing 18–20% Cr, 8–10.5% Ni, and 2% Mn), and on 316L stainless steel, obtained using the method of the present invention. As may be clearly seen, addition of a metal hydride, in the form of a 0.1M solution of $ZrH_2$, to feedwater at 288° C. flowing at 100 cc/min in contact with such steels and having an oxygen concentration of 300 ppb, caused a reduction in corrosion potential of approximately 200 mV (from +125 $mV_{she}$ to -75 $mV_{she}$) for type 304 stainless steel, and an even greater reduction of 275 mV (from +175 $mV_{she}$ to -100 $mV_{she}$) for type 316L stainless steel. It is believed that in addition to the reduction in corrosion potential obtained from hydrogen addition, further reduction in corrosion potential is obtained by the zirconium ion incorporating into oxides (Fe/Ni/Cr oxides) present in a thin layer on the surface of the steel, and formed thereon by pre-existing oxidation with oxygen present in the high temperature water.

Figure 2:
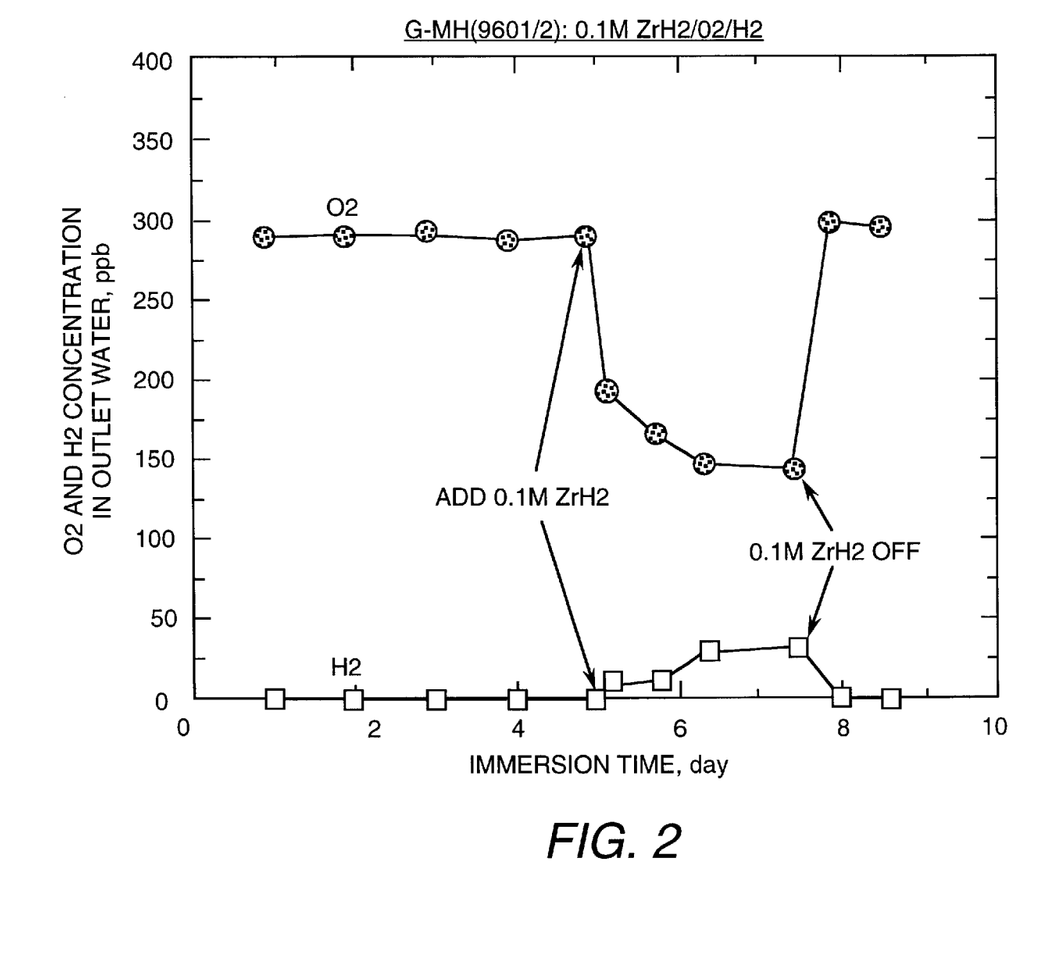
FIG. 2 is a plot of oxygen and hydrogen concentration (in parts per billion) of high temperature outlet water at 288° C. with and without the addition of a 0.1M solution of a metal hydride ($ZrH_2$)
Figure 3:
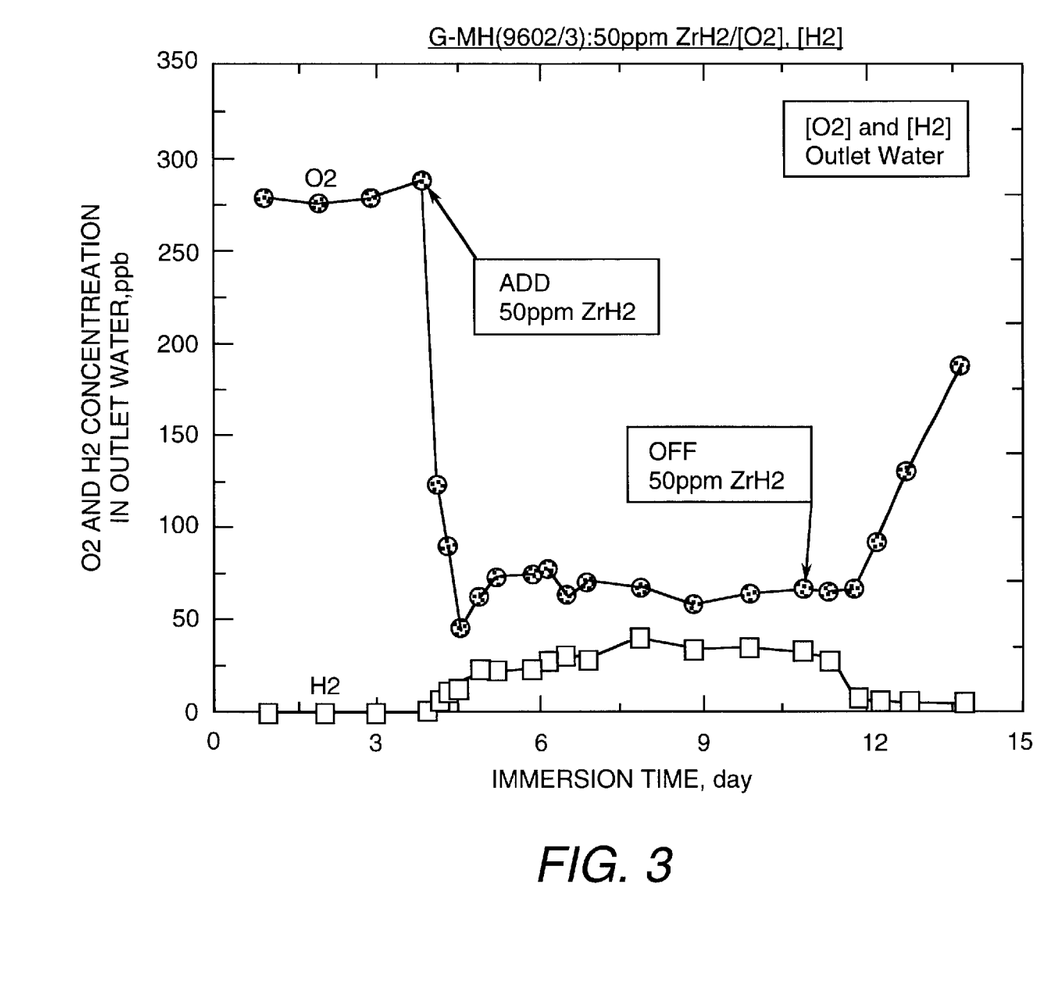
FIG. 3 is a similar plot of oxygen and hydrogen concentration (in parts per billion) of high temperature outlet water at 288° C. with and without the addition of a 50 part per million solution of a metal hydride ($ZrH_2$)

FIG. 2 establishes the correlation between the reduction in oxidation agent (oxygen) concentration and the increase in hydrogen concentration in feedwater at 288° C. containing initially 300 ppb of oxygen and roughly 0 ppb hydrogen, upon the addition of a metal hydride in the form of a 0.1M solution of $ZrH_2$. As may be clearly seen, addition of the 0.1M solution of $ZrH_2$ causes a sharp reduction in oxygen concentration from approximately 300 ppb to 150 ppb, and an increase in hydrogen concentration from 0 to 25 ppb. Correspondingly, cessation in the supply of such metal hydride causes a reversal of such effect, namely an increase in the oxygen concentration, and a drop in the hydrogen concentration in such water, to original levels. FIG. 3 shows a similar result when a different concentration of metal hydride is used, namely a 50 ppm solution of $ZrH_2$. As may be clearly seen, addition of the 50 ppm solution of $ZrH_2$ causes a sharp reduction in oxygen concentration from approximately 300 ppb to 75 ppb, and an increase in hydrogen concentration from 0 to 35 ppb. Correspondingly, cessation in the supply of such metal hydride causes a reversal of such effect, namely an increase in the oxygen concentration, and a drop in the hydrogen concentration in such water, to substantially original levels.

Figure 4:
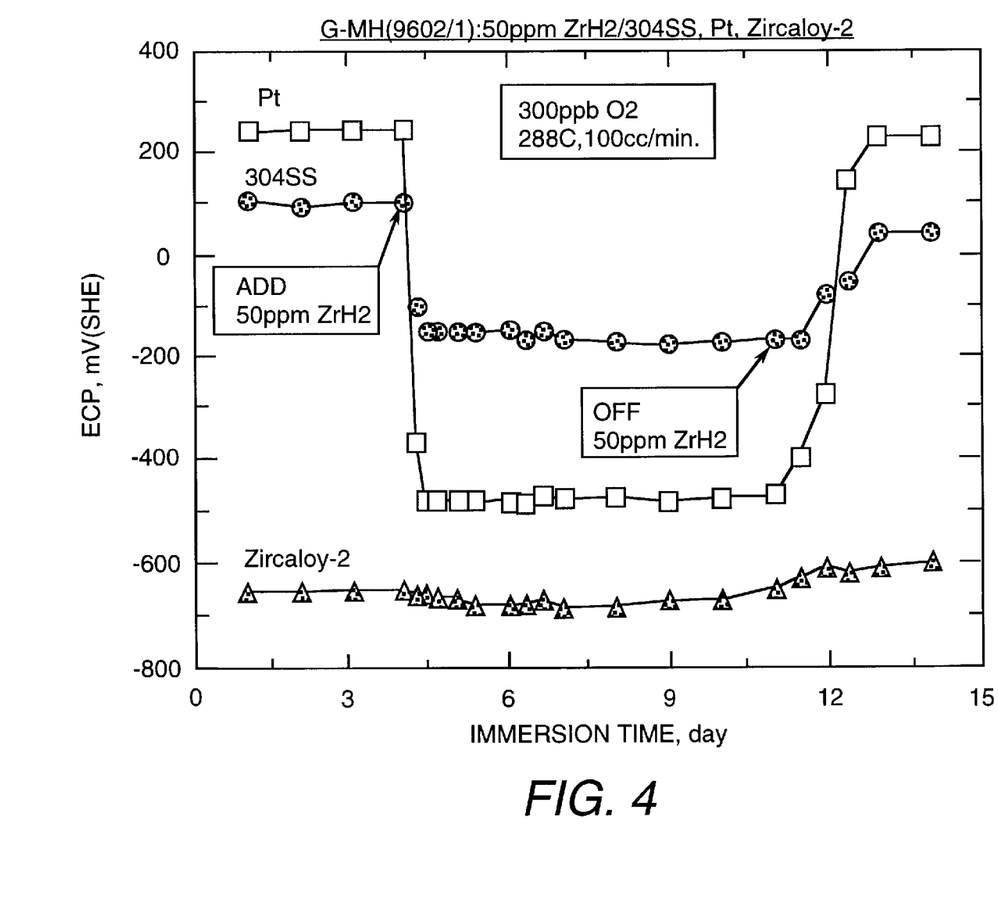
FIG. 4 is a plot of corrosion potential of type 304 stainless steel (●), immersed in high temperature water at 288° C. containing an oxygen concentration of 300 parts per billion oxygen and flowing at 100 cc/min, illustrating the beneficial results of the present invention, namely the reduction of corrosion potential upon the addition of a 50 part per million solution of a metal hydride ($ZrH_2$). Corrosion potentials of pure platinum (□) and zircaloy-2 (Δ) are included for reference.

FIG. 4, similar to FIG. 1, shows the effect of adding a 50 ppm solution of $ZrH_2$ to high temperature water at 288° C. which is in contact with type 304 stainless steel. The results can be compared with the results of FIG. 1 wherein a higher concentration of $ZrH_2$, namely a 0.1M solution of $ZrH_2$, was added to water containing 300 ppb of oxygen. As may be seen from FIG. 4, the resultant decrease in the ECP of the type 304 stainless steel is roughly the same as occurred in FIG. 1, resulting in a decrease of 200 mV, from +100 $mV_{she}$ to -100 $mV_{she}$ in the ECP of the type 304 stainless steel. Significantly, FIG. 4 shows the reduction in ECP on a pure platinum sample upon the addition of 50 ppm $ZrH_2$ solution, namely from approx. +250 $mV_{she}$ to -500 $mV_{she}$, a decrease of 750 mV. Such indicates that the method of the present invention to be effective not only on stainless steel but on platinum materials as well.

Figure 5:
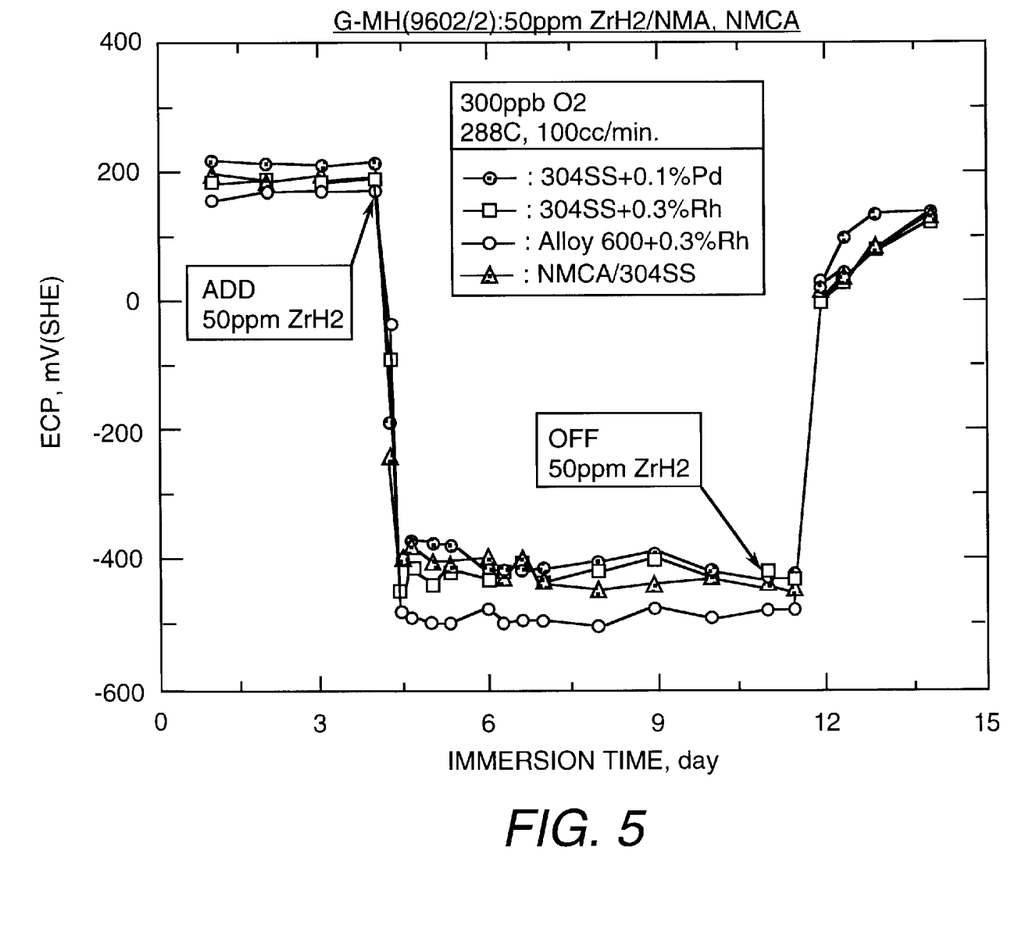
FIG. 5 is a similar plot of corrosion potential of various types of stainless steel, namely type 304 stainless steel alloyed with 0.1% palladium, (●); type 304 stainless steel alloyed with a noble metal Rh (□); alloy 600 alloyed with 0.3%Rh (o); and type 304 stainless steel coated with a noble metal (Δ); each immersed in high temperature water at 288° C. containing an oxygen concentration of 300 parts per billion and flowing at 100 cc/min, illustrating the beneficial results of the present invention, namely the reduction of corrosion potential upon the addition of a 50 part per million solution of a metal hydride ($ZrH_2$).

FIG. 5 shows the operation and effectiveness of the method of the present invention, particularly the preferred embodiment (wherein the metal hydride which is added contains a metal such as zirconium) on a low alloy steel, namely an alloy 600 steel having a 0.3%Rh alloy, as well on various type 304 steels which are alloyed with various percentages of various noble metals. In all instances the effect of the method of the present invention in adding such a metal hydride was to reduce the ECP for the respective steel or low alloy steel from approximately 200 $mV_{she}$ to approximately -400 $mV_{she}$, a decrease of 600 mV. Such results indicate that the presence of Zr on the oxide surface of the steel did not alter the catalytic properties of the noble metal alloys in the steel, and that the method of the present invention comprising addition of metal hydrides could be effectively combined with noble metal plating as known in the prior art so as to obtain optimum reduction of corrosion potential.

Some of the features and advantages of the in-situ method of the present invention are further shown and confirmed by the following examples:

EXAMPLE 1

Two test specimens, each ⅛ inch diameter ×2 inches long, one of type 304 stainless steel and the other of type 316L stainless steel, were pre-oxidized in 288° C. water containing 200 ppb oxygen for 2 weeks.

Thereafter, such test specimens were placed in an autoclave recirculating water loop, containing water at 288° C. having an oxygen concentration of 300 ppb and a flow rate of 100 cc/min. The ECP of each of the two specimens was measured over the course of 5 days using a zirconia high temperature pH sensor with a copper/cuprous oxide internal junction as a reference electrode. Measured values were converted to the standard hydrogen electrode (SHE) scale on the basis of the calculated potential for the zirconia sensor in neutral water.

On the fifth day, a suspension of 0.1M $ZrH_2$ was injected into the recirculating water loop, and the ECP of each of the steel measured. Simultaneously, the Orbisphere Model 2606 (dissolved $O_2$) and Orbisphere Model 26322 (dissolved $H_2$) were used to measure the dissolved $O_2$ and dissolved $H_2$ respectively.

FIG. 1 shows a plot of the ECP for each of the type 316L and type 304 steel obtained as a result. FIG. 2 shows a plot of the dissolved $O_2$ and dissolved $H_2$ as the 0.1M $ZrH_2$ metal hydride solution was added, and when such solution addition ceased.

EXAMPLE 2

Argon gas was purged through the injection solution.

The above procedure again employed, save that the specimens utilized were seven specimens, each ⅛ inch diameter ×2 inches long, a first comprising a pure platinum sample, a second comprising a type 304 stainless steel, and a third comprising zircaloy-2, a fourth comprising type 304 stainless steel alloyed with 0.1%Pd, a fifth comprising a type 304 stainless steel alloyed with 0.3%Rh, a sixth comprising a alloy 600 alloyed with 0.3%Rh, and a seventh comprising a type 304 stainless steel having a noble metal alloy.

Instead of adding a 0.1M $ZrH_2$ metal hydride solution, a 50 ppm $ZrH_2$ metal hydride solution was added after 5 days. FIG. 4 shows the measured ECP for each of the first three samples, prior to and during addition of such solution, and upon cessation of such solution. FIG. 5 shows the ECP over such period for each of the four remaining samples. As may be seen from each of FIGS. 4 & 5, save and except for the zircaloy-2 sample, each of the remaining steel, low alloy and platinum samples each showed a marked decrease in the ECP upon the addition of the metal hydride solution, wherein the ECP thereof returned to the initial level upon cessation of the addition of the metal hydride solution.

Equipment used in Example 1 for measuring dissolved $O_2$ and dissolved $H_2$, respectively was again used to simultaneously monitor such concentrations in the high temperature water. FIG. 3 shows the marked decrease in dissolved $O_2$ concentration upon the addition of 50 ppm $ZrH_2$ metal hydride solution, and a corresponding increase in $H_2$ concentration due to such addition of the metal hydride solution.

The foregoing examples have been disclosed for the purpose of illustration. Variations and modifications of the disclosed examples will be readily apparent to persons skilled in inorganic chemistry. For a complete definition of the methods of the invention, reference is to be had to the appended claims which are intended to encompass all such apparent variations and modifications.

What is claimed is:

1. A method for reducing in-situ the corrosion potential of stainless, low alloy, or carbon steel, surfaces of which are in contact with high temperature water containing oxygen, comprising:

adding a metal hydride directly to said water, said metal hydride capable of dissociating in said water to provide hydrogen ions which combine with said oxygen so as to reduce the concentration of oxygen in said high temperature water.

2. The method as claimed in claim 1 wherein metal ions from said metal hydride are capable of reacting with said oxygen in said high temperature water to form a substantially non-water soluble and substantially electrically insulating layer on said steel surfaces.

3. The method as claimed in claim 2 wherein said metal ions are comprised of ions of a metal selected from Groups 3, 4, or 5, international notation, of the periodic table of elements.

4. The method as claimed in claim 3 wherein said metal is selected from the group of metals consisting of the following metals, namely Sc, Ti, Y, Zr, Hf, V, & Nb.

5. The method as claimed in claim 1 wherein said metal hydride comprises zirconium hydride ($ZrH_2$).

6. The method as claimed in claim 2 wherein said metal hydride comprises zirconium hydride ($ZrH_2$), and said layer contains zirconium dioxide ($ZrO_2$).

7. The method as claimed in claim 1 wherein said metal hydride comprises yttrium hydride.

8. The method as claimed in claim 2 wherein said metal hydride comprises yttrium hydride and said layer contains $Y_2O_3$.

9. The method as claimed in claim 1 wherein said metal hydride comprises aluminum hydride.

10. The method as claimed in claim 2 wherein said metal hydride comprises aluminum hydride and said layer contains $Al_2O_3$.

11. The method as claimed in claim 1 wherein said metal hydride comprises a mixture of yttrium hydride and zirconium hydride.

12. The method as claimed in claim 2 wherein said metal hydride comprises a mixture of yttrium hydride and zirconium hydride, and said layer contains a yttria-stabilized zirconia.

13. The method as claimed in claim 2 wherein said metal ions react with a substance contained in a thin oxide layer formed on said steel surfaces thereafter rendering said thin oxide layer substantially electrically non-conducting.

14. The method as claimed in claim 13 wherein said substance is an oxide.

15. The method as claimed in claim 13 wherein said substance is oxygen.

16. The method as claimed in claim 1, said metal hydride further containing a metal selected from the group of metals consisting of scandium, titanium, yttrium, zirconium, vanadium, hafnium, and niobium; and the method further comprises the step of permitting said metal to react with one or more substances within a thin oxide layer formed on said steel surfaces.

17. A method for reducing in-situ the corrosion potential of inner surfaces of a stainless steel pressure vessel used in a boiling water nuclear reactor, wherein said surfaces are exposed to high temperature water containing a concentration of oxygen and have a thin oxide layer formed thereon, comprising:

adding a metal hydride directly to said water in contact with said steel surfaces, said metal hydride capable of dissociating in said water to provide hydrogen ions which combine with said oxygen so as to reduce the concentration of oxygen in said high temperature water;

said metal hydride containing a metal selected from a group of metals comprising scandium, titanium, yttrium, zirconium, and vanadium; and permitting said metal to react with one or more substances within said thin oxide layer so as to become incorporated into said thin oxide layer so as to render such layer a substantially electrically insulating layer.

18. The method as claimed in claim 17 wherein said substance is oxygen.

19. A method for reducing in-situ the corrosion potential of inner surfaces of a stainless steel pressure vessel used in a boiling water nuclear reactor, wherein said surfaces are exposed to high temperature water containing a concentration of oxygen and have a thin oxide layer formed thereon, comprising:

adding a metal hydride directly to said high temperature water, said metal hydride capable of dissociating in said water to provide hydrogen ions which combine with said oxygen so as to reduce the concentration of oxygen in said high temperature water;

said metal hydride selected from the group of metal hydrides comprising zirconium hydride, titanium hydride, and vanadium hydride; and wherein metal ions of said metal hydride are permitted to react with a substance within said thin oxide layer so as to become incorporated therein.

20. The method as claimed in claim 19 wherein said substance is oxygen.

21. A method for reducing the corrosion potential of an article exposed to high temperature water containing oxygen, the article comprising at least one of steel and a noble metal, the method comprising the step of:

adding a metal hydride to the water, the metal hydride being capable of dissociating in the water to provide hydrogen ions which combine with the oxygen to reduce the concentration of the oxygen in the water.

* * * * *